_(12)_ United States Patent
Ferrer et al.

(10) Patent No.: US 11,524,537 B2
(45) Date of Patent: Dec. 13, 2022

(54) VEHICLE COMMUNICATION SYSTEM FOR SHARING REAL-TIME ARTICULATED VEHICLE POSITIONS

(71) Applicant: Ford Global Technologies, LLC, Dearborn, MI (US)

(72) Inventors: John Michael Galan Ferrer, Carson, CA (US); Jayanthi Rao, West Bloomfield, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 16/758,431

(22) PCT Filed: Oct. 24, 2017

(86) PCT No.: PCT/US2017/058057
§ 371 (c)(1),
(2) Date: Apr. 23, 2020

(87) PCT Pub. No.: WO2019/083511
PCT Pub. Date: May 2, 2019

(65) Prior Publication Data
US 2020/0247200 A1 Aug. 6, 2020

(51) Int. Cl.
*G08G 1/123* (2006.01)
*B60D 1/62* (2006.01)
(Continued)

(52) U.S. Cl.
CPC .............. *B60D 1/62* (2013.01); *B60D 1/01* (2013.01); *B60D 1/30* (2013.01); *B62D 13/06* (2013.01);
(Continued)

(58) Field of Classification Search
CPC ... B60D 1/62; B60D 1/01; B60D 1/30; B62D 13/06; H04W 4/44; H04W 4/46; H04W 4/48; G01S 5/0247; G01S 5/0284
(Continued)

(56) References Cited

U.S. PATENT DOCUMENTS 7,239,958 B2   7/2007  Grougan et al.
9,037,349 B2   5/2015  Trombley et al.
(Continued)

FOREIGN PATENT DOCUMENTS

DE   102004025252 A1   12/2005
DE   102006007805 B4   8/2007
DE   10 2015 117903 A1   4/2017

OTHER PUBLICATIONS

International Search Report of the International Searching Authority for PCT/US2017/058057 dated Dec. 28, 2017.

*Primary Examiner* — Tai T Nguyen
(74) *Attorney, Agent, or Firm* — Gregory P. Brown; Brooks Kushman P.C.

(57) ABSTRACT

A vehicle, hitch, and articulating trailer include vehicle to vehicle and infrastructure communications and vehicle computing systems, which have a controller coupled to and/or including one or more of a dynamics measurement unit, a transceiver, and a position sensor, among other components. The controller(s) are configured to, in response to detecting positions of trailer corners from the position sensor, generate vehicle and trailer relative orientation and navigation data including location, velocity, and orientation, utilizing vehicle and trailer electronic polyhedrons articulating about a hitch point and representing the combination vehicle and trailer predicted path and envelopes. In response to detected trailer movement relative to the hitch point, the generated articulated polyhedrons are generated with the navigation data, which includes the location, speed, and orientation, (Continued)

which are in turn communicated to nearby vehicles and roadway infrastructure. Initial trailer vertices may be generated with wireless and mobile devices to generate the trailer polyhedron.

20 Claims, 3 Drawing Sheets

(51) Int. Cl.
| | | |
|---|---|---|
| *H04W 4/46* | (2018.01) | |
| *H04W 4/48* | (2018.01) | |
| *H04W 4/44* | (2018.01) | |
| *B60D 1/01* | (2006.01) | |
| *B60D 1/30* | (2006.01) | |
| *B62D 13/06* | (2006.01) | |

(52) U.S. Cl.
CPC ............... *H04W 4/44* (2018.02); *H04W 4/46* (2018.02); *H04W 4/48* (2018.02)

(58) Field of Classification Search
USPC .......................................................... 340/988
See application file for complete search history.

(56) References Cited

U.S. PATENT DOCUMENTS

| | | |
|---|---|---|
| 9,558,409 B2 | 1/2017 | Pliefke |
| 9,594,155 B2 | 3/2017 | Cashler |
| 9,595,195 B2 | 3/2017 | Varoglu et al. |
| 2007/0260386 A1 | 11/2007 | Tandy, Jr. et al. |
| 2014/0058614 A1* | 2/2014 | Trombley ................. B60R 1/00 |
| | | 701/29.1 |
| 2014/0288769 A1 | 9/2014 | Trombley et al. |
| 2014/0297128 A1* | 10/2014 | Lavoie ............ B60W 30/18036 |
| | | 701/41 |
| 2017/0008560 A1 | 1/2017 | Kyrtsos et al. |
| 2017/0057413 A1 | 3/2017 | Shehan et al. |
| 2018/0127024 A1* | 5/2018 | Pourrezaei Khaligh ..................... |
| | | B60D 1/245 |

\* cited by examiner

FIG. 1

FIG. 2 (SCHEMATIC OF VEHICLE 100 & TRAILER TR)

FIG. 3 (TOP VIEW) (POLYHEDRONS VPH, TPH)

FIG. 4 (SIDE VIEW) (POLYHEDRONS VPH, TPH)

FIG. 5 (TOP VIEW, ARTICULATED) (POLYHEDRONS VPH, TPH)

FIG. 6 (SIDE VIEW, ARTICULATED) (POLYHEDRONS VPH, TPH)

VEHICLE COMMUNICATION SYSTEM FOR SHARING REAL-TIME ARTICULATED VEHICLE POSITIONS

TECHNICAL FIELD

The disclosure relates to vehicle to vehicle and infrastructure communications systems that share real-time articulating vehicle and trailer position and relative orientation information.

BACKGROUND

Vehicle manufacturers have developed various types of in-vehicle and/or on-board computer processing systems that include vehicle control, navigation, vehicle to vehicle and vehicle to infrastructure communications systems, and related messaging capabilities, and various other vehicle related applications. Additionally, such systems sometimes are further enabled to generate, transmit, and receive messages to and from nearby vehicles and roadway infrastructure, which messages include vehicle location, speed, and basic vehicle geometry data that enables vehicles to navigate roadways and to travel in close proximity with enhanced situational awareness of such nearby vehicles. Opportunities exist for enhanced situational awareness utilizing additional vehicle information related to multibody vehicles such as personal vehicles having trailers, and larger tractor trailer vehicle combinations.

SUMMARY

Many types of personal, commercial, and industrial vehicles, including combustion engine and hybrid, plug-in hybrid, and battery electric vehicles, hereafter collectively referred to as "vehicles," include several types of in-vehicle computing systems, controllers, interfaces, networks, communications capabilities, and applications, which enable vehicle operation, as well as on-board and in-vehicle navigation, vehicle to vehicle and vehicle to infrastructure communications, and related communications capabilities, and control and exchange of data between nearby vehicles and roadway or infrastructure systems.

The disclosure is directed to a vehicle having a trailer hitch configured to pull an articulating trailer. The vehicle also incorporates at least one and/or one or more controller(s) coupled to a position sensor and a dynamics measurement unit (DMU), which are responsive to detecting and/or receiving positions of vertices of a trailer connected to the vehicle, from the position sensor. The DMU and position sensor are configured to generate electronic vehicle and trailer volumetric models formed as polyhedrons, which include the trailer vertices as vertices of the polyhedron vertices. The vehicle and trailer polyhedrons are electronically articulated about a hitch point of the trailer hitch, in response to detected trailer movement relative to the hitch point. The generated and articulated polyhedrons are periodically communicated to one or more internal and/or external controller(s) and/or vehicle communications units, which translate and communicate vehicle and trailer position information to controllers of other vehicles and roadway infrastructure.

In variations, the position sensor includes a transceiver and the controller(s) are further configured to detect in real time, during operation of the vehicle and trailer, positions of the trailer vertices from respective wireless motion trackers, which are mounted to and positioned at the trailer vertices, and which are in communication with the transceiver. The positions of the trailer vertices are detected relative to the hitch point. The controller(s) and/or DMU also generate the vehicle and trailer polyhedrons articulated about the hitch point and include the trailer vertices as the polyhedron vertices.

The disclosure is also directed to modifications of the position sensor to include a line of sight range finder that is configured to ping and detect initial trailer vertices as two dimensional positions of range finder reflectors, relative to the hitch point, and positioned at vertices on a trailer, and to generate the trailer polyhedron. The range finder is also configured to be vertically adjustable relative to a ground surface, and to detect the initial trailer vertices as three dimensional positions of the range finder reflectors relative to the hitch point. In this arrangement, the controller(s) are further configured to respond to the detected trailer movement relative to the hitch point, and to adjust the initial trailer vertices according to the detected trailer movement to generate the trailer polyhedron articulated relative to the hitch point.

In additional arrangements, the position sensor incorporates at least one hitch yaw and pitch sensor, and the controller is further configured to respond to and to be responsive to yaw and pitch signals from the respective sensors, and to generate the articulated polyhedrons adjusted by the yaw and pitch signals. Further exemplary modifications are directed to the controller(s) coupled to multiple antennas and at least one transceiver configured to communicate with a mobile device.

In this modified version, the controller(s) are further configured to respond to detecting positions of trailer vertices from the mobile device detected by signal strength at each of the multiple antennas, generate initial trailer corner points and/or vertices for a trailer, which by the controllers are mapped to trailer polyhedron vertices relative to the hitch point, according to the detected and/or received positions of trailer vertices. In this modification, the controller(s) are further configured to respond to the yaw and pitch signals generated by the at least one yaw and pitch sensor, and to adjust the positions of the initial trailer vertices according to the yaw and pitch signals as the trailer articulates relative to the vehicle. The controller(s) also generate the articulated polyhedrons according to the adjusted positions of the trailer vertices.

The controller(s) and mobile device are further configured to generate the trailer polyhedron by enabling to enter trailer dimensions and vertex data and/or to draw and dimension the polyhedron utilizing one or more photos or images created by the mobile device, and to thereby generate the initial trailer vertices for the trailer, relative to the hitch point.

Once the polyhedrons are generated, the controller(s) are further configured to respond to yaw and pitch signals as the trailer articulates relative to the vehicle, and to adjust the positions of the initial trailer vertices according to the yaw and pitch signals, and to generate the articulated polyhedrons according to the adjusted positions of the trailer vertices.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
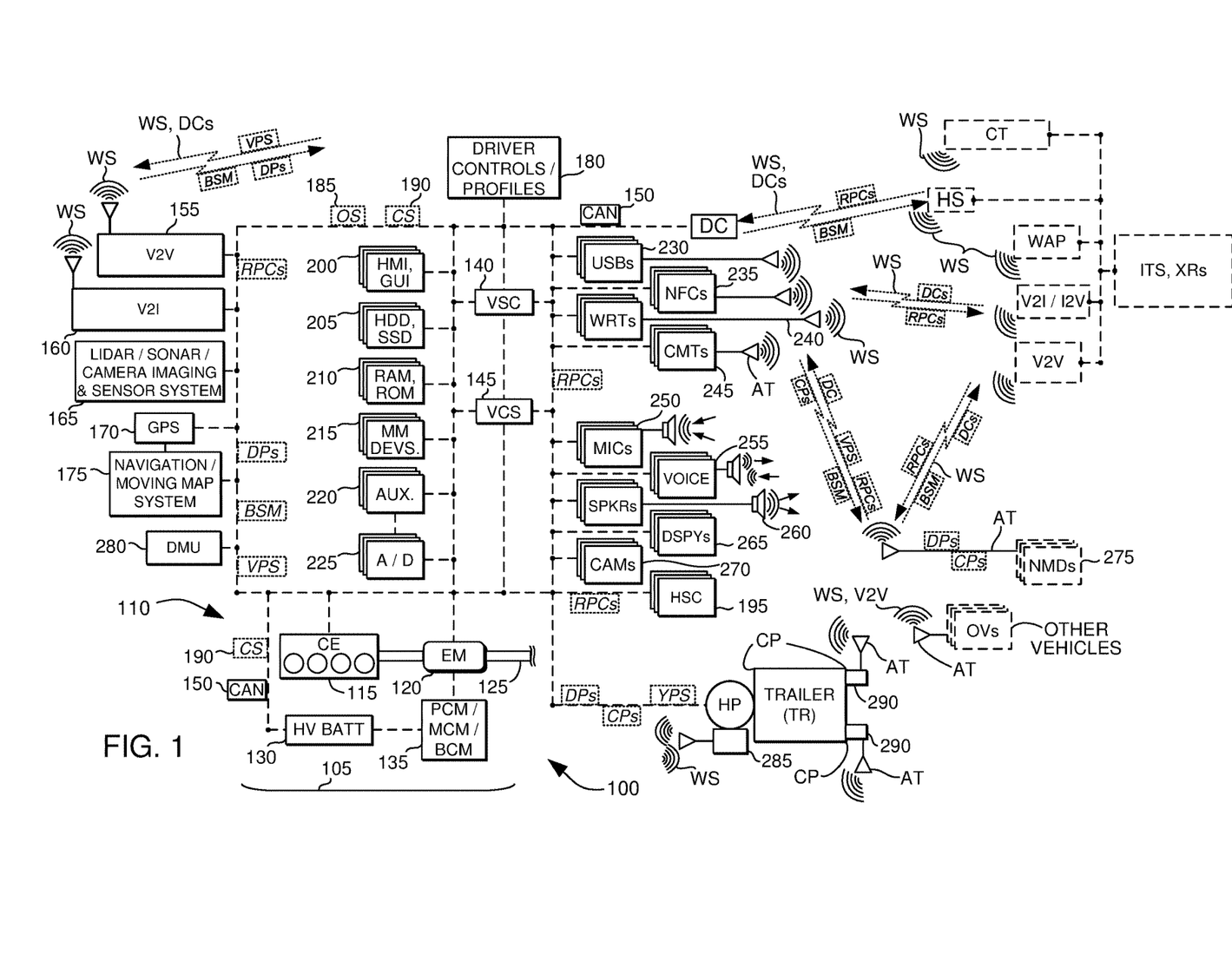
FIG. 1 is a schematic illustration of vehicles and their systems, controllers, components, sensors, actuators, and methods of operation.
Figure 2:
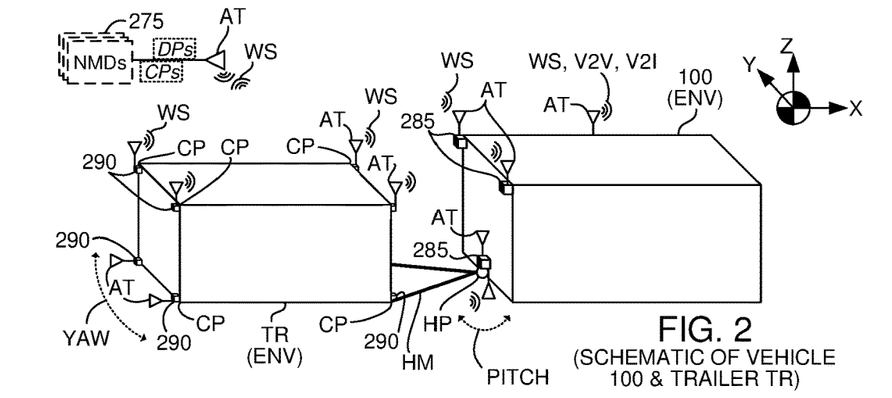
FIG. 2 illustrates additional aspects of the schematically shown vehicles of FIG. 1 with certain components removed and others added for purposes of added illustration.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and/or that may be incorporated as part of a vehicle system controller (VSC) 140 and a vehicle computing system (VCS) and controller 145, which are in communication with PCM/MCM/BCM 135, and other controllers. For example, in some configurations for purposes of example but not limitation, VSC 140 and/or VCS 145 is and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink.com, openXCplatform.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC® AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing in-vehicle or on-board HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUIs, and also may include utilization of on-board or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), vehicle area networks (VANs), wide area networks (WANs), peer to peer (P2P), vehicle to vehicle (V2V), and vehicle to infrastructure and infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V) 155, and vehicle to roadway infrastructure to vehicle communication system (V2I) 160, a LIDAR/SONAR (light and/or sound detection and ranging) and/or video camera roadway proximity imaging and obstacle sensor system 165, a GPS or global positioning system 170, and a navigation and moving map display and sensor system 175, among others. As used here, GPS is typically referred to as the United States GPS system, but also is intended in this disclosure to generically also refer to and include other positioning systems, including for example the Russian GLONASS, Globalnaya Navigazionnaya Sputnikovaya Sistema, or Global Navigation Satellite System (GNSS), as well as the European Galileo and China BeiDou GNSSs, among others.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V 155 and V2I 160 (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

Such aspects include for purposes of example but not for limitation, United States (U.S.) Department of Transportation Intelligent Transportation System (ITS) standards available at www.standards.its.dot.gov and www.its.dot.gov, and which include the Connected Vehicle Reference Implementation Architecture (CVRIA), local.iteris.com/cvria/.

The U.S. National Highway and Transportation System Administration (NHTSA) www.nhtsa.gov has developed additional refinements that include basic safety message protocols and formats described in various resources available at www.nhtsa.gov/technology-innovation/vehicle-vehicle-communications, and which also include various NHTSA reports, such as for example report no. DOT HS 812014 entitled "NHTSA: Vehicle-to-Vehicle Communications: Readiness of V2V Technology for Application," www.nhtsa.gov/staticfiles/rulemaking/pdf/V2V/Readiness-of-V2V-Technology-for-Application-812014.pdf, report no. DOT HS 811 492A entitled "Vehicle Safety Communications—Applications (VSC-A)," available from www.nhtsa.gov/DOT/NHTSA/NVS/Crash Avoidance/Technical Publications/2011/811492B.pdf and report no. DOT HS 081 514 entitled "Federal Motor Vehicle Safety Standards: Vehicle-to-Vehicle (V2V) Communications, Docket No. NHTSA-2014-0022," available from www.nhtsa.gov/staticfiles/rulemaking/pdf/V2V/V2V-ANPRM_081514.pdf. Many of and related documents and reports are also available from the U.S. Government Printing Office located at www.gpo.gov.

Such protocols, standards, and/or messaging formats are also enabled by various other organizations and resources, including for example many European reports, such that entitled "Directive 2010/40/EU on the framework for the deployment of Intelligent Transport Systems in the field of road transport and for interfaces with other modes of transport," which is available at eur-lex.europa.eu/legal-content/EN/ALL/?uri=CELEX %3A32010L0040, and another report entitled "C-ITS Deployment Platform—Final Report, January 2016," available at ec.europa.eu/transport/themes/its/doc/c-its-platform-final-report-january-2016.pdf.

A number of international standards organizations are also involved in the field of technology and have generated various V2X resources such as the Society of Automotive Engineers International™ (SAE) telematics and related standards J2945 and J2735: "On-Board System Requirements for V2V Safety Communications Standard," SAE J2945/1_201603, standards.sae.org/j2945/1_201603/, and "Dedicated Short Range Communications (DSRC) Message Set Dictionary Standard," SAE J2735_201603, standards.sae.org/j2735_201603, and others available from topics.sae.org/telematics/standards/automotive.

The messages for V2V applications are defined in, among other references, SAE J2735 as the Basic Safety Message(s) (BSMs, BSM-II) parts 1 and 2. The disclosure recites BSM and BSM-II messaging capabilities interchangeably and contemplates that extended data and information capabilities enabled by the BSM-II standards are referred to in every instance herein where BSM is recited. The SAE 2735 BSM capabilities support and enable wireless communication between vehicles and/or between vehicles and fixed or nomadic devices, including roadway, intersection, and other infrastructure devices and systems (V2I). The SAE J2735 standard describes, defines, and specifies messages and data elements that make up messages/dialogs specifically for use by vehicle, infrastructure, and other off-board applications that utilize 5.9 gigahertz (GHz) DSRC for Wireless Access in Vehicular Environments (WAVE) communications systems.

The current J2735 standard describes requirements for using the BSM for V2V safety applications. The SAE J2945 standard describes communication performance requirements of the DSRC Message sets and the BSM data elements that support V2V and V2I safety applications. Such WAVE communications and related systems are described in more detail in various reports established by and available from the Institute of Electrical and Electronics Engineers (IEEE) as described below. See, for example, standards.ieee.org, and more specifically, IEEE standard 1609, entitled, "Guide for Wireless Access in Vehicular Environments (WAVE) Architecture," which is available from standards.ieee.org/develop/wg/1609_WG.html.

The IEEE 1609 WAVE standards enable and define an architecture and a standardized set of communications services and interfaces that enable secure V2V and V2I wireless communications. These standards enable a range of transportation and navigation applications, including vehicle safety, automated tolling, enhanced navigation, and traffic management, among others. The IEEE 1609 Wave capabilities are utilized in conjunction with others directed to various aspects of network and communications standards and architectures, including those managed by the IEEE 802 local area network and metropolitan area network (LAN/MAN) standards committee, which can be found at www.ieee802.org, as well as standards.ieee.org.

IEEE Standards 802.11 support software and firmware communications services of IEEE 1609, and are enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

These technology-enabling standards have many variations that enable additional capabilities for specific applications, including for example automotive network communications to support Intelligent Transportation Systems (ITS) applications, including data communications between vehicles and between vehicles and transportation infrastructure in the ITS frequency band surrounding 5.9 GHz (5.85-5.925 GHz).

IEEE Standard 802.11p is an amendment to 802.11 that enables and define wireless communications supporting IEEE 1609, which further enable automotive and transportation and roadway infrastructure system applications (V2I), including LANs, WANs, PANs, and peer to peer or V2V networks and data communications that are also referred to as "V2x" or vehicle to vehicle and vehicle to everything. IEEE 802.11p is entitled in part "Wireless LAN Medium Access Control (MAC) and Physical Layer (PHY) Specifications: Amendment: Wireless Access in Vehicular Environments (WAVE)," and is available from ieeexplore.ieee.org/document/5514475/.

VSC 140, VCS 145, and/or other controllers, devices, and processors according to the disclosure are enabled by and incorporate such V2x, V2V, and V2I technologies and capabilities, and also utilize various additional technologies to determine and establish absolute and relative positioning and navigation of vehicle 100 and towed elements such as trailer TR that articulates about a vehicle hitch point (HP), and V2V and V2I sharing and communication of such positioning and navigation data and information. For further example, various absolute and relative positioning technologies contemplated for utilization in the disclosure include the GPS and GNSS systems described above and also include Wide Area Augmentation Systems (WAAS), and Real Time Kinematics (RTK) systems.

WAAS is an augmented GPS and GNSS that uses supplemental ground reference stations to measure deviations from GPS and GNSS positions and to enable corrections in the continental United States. RTK systems enable positional accuracy improvements using the difference in the phase of GPS and GNSS signals two fixed or moving reference stations. Such accuracy improving capabilities can enable position accuracy with resolutions of up to a few centimeters. These and related capabilities can be understood from and obtained in a number of the preceding references, and also in a U.S. NHTSA report by the VSC 2 Consortium, entitled "Vehicle Safety Communications—Applications (VSC-A) Final Report: Appendix Volume 2 Communications and Positioning," Report No. DOT HS 811 492C, September 2011, available from www.nhtsa.gov/Research/Crash+Avoidance/Office+of+Crash+Avoidance+Research+Technical+Publications.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data. Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, and/or various others. For example, the controllers may establish bidirectional communications with such internal and external sources, and communicate control commands, logic, and instructions and code, data, information, and signals to and/or from engine 115, EM 120, batteries 130, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 185, and control or command signals (CS) 190 received from and sent to and between controllers and vehicle components and systems, either over wired and/or wireless data and signaling connections. OS 185, and CS 190, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs) 195, which further refer to, incorporate, and include buttons, and/or switches, and steering wheel controls and buttons (SWCs), instrument cluster and panel hardware and software buttons and switches, and GUI display software switches and controls, among other controls In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth™" devices, that enable wireless personal and local area networks (WPANs, WLANs) or "WiFi" IEEE 802.11 and 803.11 communications standards, and/or analog and digital cellular network modems and transceivers (CMTs) 245 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, nomadic and mobile devices (NMDs) 275, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs 195, and may also include, incorporate, and/or be integrated with and/or as part of GUI 200 and the contemplated hardware and software SWCs, controls, buttons, and/or switches 195. Such HSCs 195, as already noted, may be hardware or software or combinations thereof and may be configurable utilizing one or more predetermined, default, and adjustable factory and/or driver controls, profiles, and/or preferences of repository 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS and GNSS devices, and similar devices and components that each may include integrated transceivers and antennas AT, wired and plugged connectors DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WS, with external near and far nomadic, portable, and/or mobile devices 275, networks, and systems (V2X) that may include, for example, other vehicles (OV, V2V), roadway and infrastructure communications systems (V2I) such as hotspots and wireless access points (HS/WAPs), nano and micro and regular cellular access points and towers (CT), external routers (XRs), and related and accessible external, remote networks, systems, and servers.

With continuing reference to the various figures, including FIGS. 1, 2, 3, 4, 5, 6, 7, 8, and 9, it may be understood by those with knowledge in the relevant fields of technology that the disclosure contemplates vehicle 100 to include at least one and/or one or more controller(s) such as VSC 140, VCS 145, and others coupled with an in-vehicle or on-board transceiver AT, such as those described in connection with USBs 230, NFCs 235, WRTs 240, and/or CMTs 245. The controller(s) 140, 145 and transceiver(s) AT are configured to detect WSs and connect to nearby or proximate or far wired and wireless network devices having in-range WSs, as well as third-party, off-board, external devices such as nomadic, portable, and/or mobile or nomadic mobile devices 275.

Vehicle 100 also includes the various controller(s) to include a dynamics measurement unit (DMU) 280 and one or more position sensors 285, which are coupled with, embedded as part of, incorporated by, and/or embodied the various controllers already described. DMU 280 is configured to enable additional measurement and conversion of position and navigation data points (DPs) of vehicle 100 and/or trailer TR, and to communicate such measured and converted data points DPs to other onboard and offboard controller(s) utilizing the various networks and to enable V2X, V2V, and/or V2I data sharing. Each of such controller(s) like DMU 280 and position sensor(s) 285 include and may include integrated transceivers with antennas AT, and may also communicate and utilize transceivers and antennas AT of other coupled controller(s) and communications devices.

Such controller(s) and sensors of vehicle 100, including DMU 280 and position sensors 285, are configured to detect, measure, convert, and communicate dimensions of and positions of points located on vehicle 100 and trailer TR as they move during operation, and they articulate about hitch point HP during such movement. This capability enables V2V and V2I BSM enabled communication of static and dynamic positions and volumetric envelopes (ENV, FIG. 2) or polyhedrons of and electronic representations of vehicle 100 and articulating trailer TR in absolute positions as well as relative positions related to vehicle 100 and trailer TR, a trailer hitch and hitch point (HP) of vehicle 100, and other vehicles OVs and roadway infrastructure (ITS) in a particular area and roadway. As may be understood with reference also specifically to FIGS. 7, 8, and 9, such other vehicles OVs and infrastructure ITS are configured with V2V and V2I BSM-enabled communications capabilities that include transceivers and antennas AT.

This in turn further enables path prediction (PP) of vehicle 100 and articulating trailer TR as well as an associated predicted path envelope (PPE, FIGS. 7, 8, 9), in view of and with an awareness of other nearby vehicles and trailers, so as to improve situational awareness and navigation capabilities of such vehicles, including vehicle 100, in the larger scale V2X, V2V, V2I, and ITS systems described elsewhere and contemplated herein. The disclosure also contemplates DMU 280 configured to utilize rectilinear or Cartesian (x, y, z), and/or International Standards System (ISO) spherical (r or $\rho$—rho, $\theta$—theta, $\varphi$—phi) coordinate, position, and distance measurement systems and methods to receive, measure, translate, convert, and communicate such position and location DPs in real-time and upon request, during operation of vehicle 100 and trailer TR. FIGS. 2 through 7, and 9 include representational X, Y, and Z Cartesian coordinate axes shown in both two and three dimensions for purposes of further illustration.

For example, position sensors 285 may receive and communicate via wireless signals WS such DPs as navigation location data and/or as positions of points of corners (CPs) on vehicle 100 and/or trailer TR, which CPs may be absolute or relative to other points on vehicle 100 and trailer TR, such as a hitch point (HP) located on vehicle 100, about which vehicle 100 and trailer TR articulate relative to one another during operation. Such DPs may include information defining points on vehicle 100 and trailer TR, in Cartesian and/or spherical coordinates, as well as the electronically representational polyhedrons or envelopes that substantially represent and enable electronic representations of vehicle 100 and trailer TR.

For example, one such vehicle polyhedron VPH may substantially or approximately define and/or represent the physical volumetric envelope (ENV) of vehicle 100, and another polyhedron TPH may substantially define, depict, and/or represent the trailer TR. For purposes of further illustration, FIG. 2 substantially depicts a two-dimensional perspective view or schematic or block diagram, of a three dimensional vehicle 100 and trailer TR, represented as envelopes ENV. Vehicle 100 and trailer TR are schematically connected by a trailer hitch mechanism HM to enable relative articulation about hitch point HP, in pitch rotation about a lateral or side to side Y-axis shown directionally into the plane of FIG. 2, and in a yaw rotation direction about bottom to top or vertical Z-axis orientated vertically about FIG. 2.

Figure 3:
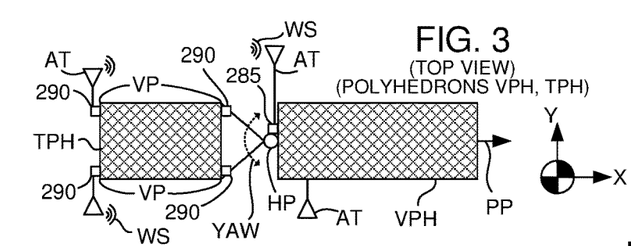
FIG. 3 depicts a top or plan view and FIG. 4 depicts a side or elevational view of the vehicles of FIG. 2, with additional capabilities and features of the disclosure.
Figure 4:
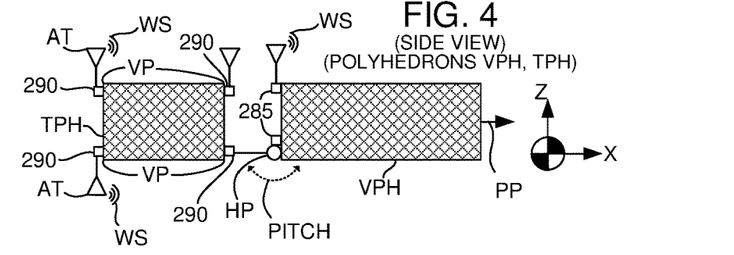

Depending on the particular application and requirements for a certain resolution and fidelity of such vehicle and trailer polyhedron representations VPH, TPH, and with reference now specifically to FIG. 2, and the top view of FIG. 3, and side view of FIG. 4, such can be represented by hitch point HP and all and/or most corner points CPs of trailer TR, which CPs can correspond to vertex points VPs of the polyhedrons VPH, TPH relative to hitch point HP about which the polyhedrons articulate. In another variation for lower resolution arrangements, vehicle 100 and trailer TR can be represented by the hitch point HP at one end of the contemplated polyhedrons VPH, TPH, and at least two or three CPs at a respective opposite end of trailer TR.

Other equally effective representations can also enable definition of the polyhedrons VPH, TPH relative to the hitch point HP. Once statically defined while vehicle 100 and trailer TR are at static or at rest, as may be understood and/or inferred from FIGS. 2, 3, and 4, such representations VPH, TPH can be utilized by DMU 280 and other controller(s) to translate and articulate TPH relative to VPH about hitch point HP, according to and responsive to real-time movement of the corresponding points CPs on trailer TR, and/or vehicle 100. Although the various figures only depict CPs in connection with trailer TR, such CPs may also be detected and utilized for vehicle 100. However, the disclosure is directed to more efficient utilization of the relative positions of CPs of trailer TR with respect to trailer TR, such that only the trailer polyhedron TPH need be detected, translated, and articulated about hitch point HP and relative to vehicle 100. Such articulated trailer TR positions can be understood with reference to the articulated top view of FIG. 5 and the side view of FIG. 6.

In further examples, the controller(s) such as DMU 280 are configured to receive and/or generate initial electronic models of vehicle 100 and trailer TR, which may be defined as the respective electronically representational cuboid models or polyhedrons VPH and TPH (FIGS. 3 and 4). Vehicle and trailer polyhedrons VPH and TPH have initial vertex points VPs or vertices VPs that substantially correspond to and are mapped by DMU 280 or other controller(s), from a plurality of points or corners or corner points CPs of the actual static vehicle 100 and trailer TR (FIG. 2). Such CPs and mapped VPs are and/or may be detected and measured relative to the actual (FIG. 2) and the electronically representational hitch point HP of FIGS. 3 through 6. Polyhedrons VPH, TPH each include hitch point HP about which they and/or trailer TR TPH articulate(s), and all, most, or fewer such corners or points of vehicle 100 and trailer TR may also be represented by polyhedron vertices VPs, which representations depend upon the desired resolution of such electronically representational polyhedrons VPH, TPH.

Figure 5:
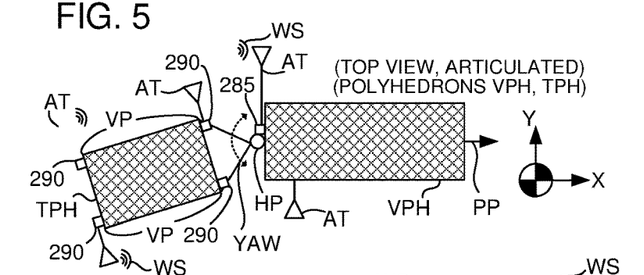
FIGS. 5 and 6 show a top or plan view and a side or elevational view of the vehicles of FIGS. 2, 3, and 4, which certain additional features and capabilities shown for purposes of further example.
Figure 6:
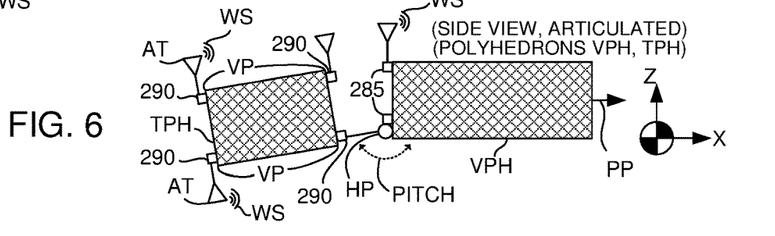

During operation of vehicle 100 and articulating trailer TR, the controller(s) such as DMU 280, respond to detecting and/or receiving from the position sensors 285, positions and/or distances and offset positions of corners CPs or vertices of trailer TR, which are different (for example such as those in FIGS. 5 and 6), from the initially determined CPs (such as those detected in FIGS. 2, 3, and 4). The newly detected CPs correspond to and/or by the controller(s) are mapped to vertices VPs of polyhedrons VPH, TPH, as either absolute positions and/or as positions relative to hitch point HP. The newly mapped VPs such as those detected and represented in the articulated illustrations of FIGS. 5 and 6, are translated from the initial VPs depicted in FIGS. 3 and 4, responsive to and according to the actual movement of trailer TR and the corresponding CPs relative to hitch point HP and vehicle 100.

Upon detecting and/or receiving the corner positions CPs from position sensors 285, DMU 280 generates and maps CPs to VPs to generate the TPH and the VPH polyhedron, relative to and articulated about hitch point HP, and responsive to and according to the changes in position of the CPs and VPs from the initial positions and/or prior positions, to the newly detected positions. In combination with absolute location information from GPS 170, the controller(s) then enable precise location of the vehicle 100 and trailer TR combination as well as the relative, articulated orientation of the trailer TR relative to hitch point HP and vehicle 100.

Controller(s) such as DMU 280 and position sensors 285 detect and/or receive positions of the trailer corners CPs, and detect actual movement of trailer TR relative to hitch point HP. In response, the controller(s) communicate the generated, articulated vehicle and trailer polyhedrons VPH, TPH, to at least one and/or one or more vehicle communications units, such as for example V2V and V2I communications units 155, 160. Such vehicle and trailer orientation information and GPS-identified location data are then transmitted as part of a V2V and/or V2I message communication, which may utilize for example the BSMs, BSM-II V2V and V2I, OBD, OpenXC, and other message technologies described elsewhere herein. Such communicated BSMs may also include predicted path PP information and predicted path envelope PPE information, as may be understood with reference again to FIGS. 7, 8, and 9. Such PP and PPE information may also be derived from the BSM and/or BSM-II message information by V2V and V2I external to vehicle 100 and by recipient OV vehicle controllers and ITS systems.

The sharing and communication of the information for the articulated polyhedrons VPH, TPH is and/or may be shared as DPs via the V2X, V2V, and V2I communications systems 155, 160, 240, 245, and others as already described. More specifically, such can be shared, communicated, and transmitted as part of the extended messaging technologies enabled as the Basic Safety Messages, parts I and II (BSMs, BSM-IIs) specified by the SAE J2735, and the many related standards and architectures described elsewhere herein, and which should be known to and understood by those having knowledge in the relevant technology.

In further variations, position sensor(s) 285 also includes one or more transceivers and antennas AT, which are configured to communicate with wireless motion trackers 290 that are mounted or positioned on and/or proximate to corners or vertices CPs of trailer TR, as may be understood with reference to FIGS. 2, 3, 4, 5, and 6. A number of such wireless motion trackers are commercially available that enable wireless six degree of freedom motion detection by position sensors 285 over the distances and ranges of motions contemplated by the disclosure. The controller(s) such as DMU 280 (FIG. 1) are further configured to detect in real-time, absolute and/or relative positions of the trailer vertices or corner points CPs, which are and/or may be detected initially for static positions of vehicle 100 and trailer TR (FIGS. 2, 3, and 4), and subsequently in new, moved, or translated positions as vehicle 100 and trailer TR articulate about HP during movement (FIGS. 5, 6, 7, 8, and 9). DMU 280 and other controller(s) are further configured to generate vehicle and trailer polyhedrons VPH, TPH, which polyhedrons are articulated about hitch point HP according to the movement (as shown for example in FIGS. 4 and 5), and to include trailer vertices or corner points CPs mapped to the polyhedron VPs.

Also contemplated by the disclosure is position sensor(s) 285 including a line of sight range finder such as an acoustic, ultrasonic, infrared, and/or laser range finder, which is configured to ping and detect initial and/or moving trailer vertices or corner points CPs. In one variation, such line of sight range finder position sensors 285 are adapted to detect CPs in two dimensions (for example, a forward to back or longitudinal X-direction from front to rear of trailer TR, and a lateral Y-direction from side to side), and in another, three dimensions that also include a vertical z-direction from bottom to top. See, for example, FIGS. 2, 3, 4, and 5, among other figures.

Such range finder position sensors 285 may be compatible for use with range finder reflectors mounted or positioned at CPs, and selected to reflect the respective line of sight range finder energy source, whether it be an acoustic, ultrasonic, infrared, or laser energy source. In the two dimensional configuration of line of sight range finder position sensors 285, such sensor(s) 285 may be vertically adjustable relative to a ground surface (not shown) and the vertical and/or top to bottom Z-direction (FIGS. 2 and 4).

In modified adaptations, position sensor or sensors 285 incorporate, include, and/or are modified to be at least one hitch yaw and pitch sensor 285, which is and/or may be mounted to or integrated with hitch point HP. In this variation, position and yaw and pitch sensor(s) 285 are configured to detect relative motion between vehicle 100 and trailer TR about hitch point HP, and to generate yaw and pitch signals (YPS), as vehicle 100 and trailer TR articulate with respect to one another during movement or translation of vehicle 100 and trailer TR. In this modification, the controller(s), such as DMU 280 and/or others, are further configured to respond to YPSs from the respective sensors 285, and in response to generate the articulated polyhedrons VPH, TPH and associated VPs, adjusted by the yaw and pitch signals, relative to hitch point HP.

In further variations, the controller(s) are also coupled to at least one and/or multiple transceivers and antennas ATs, also in some configurations including transceivers and antennas AT such as those incorporated with WRTs 240, CMTs 245, and others, which are further configured to communicate with at least one and/or one or more and/or mobile devices such as NMDs 275. This variation also contemplates the controller(s) and position sensors or yaw and pitch sensors 285 configured to detect, receive, and respond to detecting and/or receiving one or more or a plurality of positions of trailer vertex or corner points from the mobile device(s).

The controller(s) and/or position sensor(s) 285 are configured to detect the positions by detecting signal strength of the mobile device(s) or NMDs 275 at each of the multiple antennas ATs, when the mobile device(s) or NMDs 275 are positioned proximate the CPs of the trailer TR, and are actuated or controlled to generate and transmit a signal, in response to which the controller(s) and/or sensors(s) 285 detect the signal strength between multiple antennas and interferometrically detect positions of the CPs. The positions of the CPs are mapped by the controller(s) and/or sensor(s) 285 to the polyhedron VPs, which enables generation of the initial static and subsequently translated and articulated polyhedrons VPH, TPH about hitch point HP.

In still other variations of the disclosure, the controller(s) such as DMU 280, and the position sensors and/or yaw and pitch sensors 285 are further configured to receive and respond to detecting and/or receiving positions of CPs, which may be communicated by one or more mobile devices, such as NMDs 275 (FIGS. 1 and 2). In this variation, NMDs 275 are enabled to generate such CP positions of trailer TR by enabling a user to manually designate and dimension one or more CPs, and/or to draw a representative polyhedron about an image taken with a camera of NMDs 275 of the trailer TR, and to dimension the CPs of trailer TR with position data for each CP, which positions may be absolute positions and/or positions relative to hitch point HP, and which positions may include two or three points of CPs of trailer TR, and a height of the trailer.

These CP positions generated and communicated by NMDs 275 are then utilized by DMU 280 and/or other controller(s) to generate the initial positions of corners or vertices CPs for trailer TR, which in turn are mapped to corresponding VPs to generate polyhedrons VPH, TPH in the initial, static orientations and/or relative to hitch point HP (FIGS. 2, 3, 4). Subsequently, during operation, movements, and translation of vehicle 100 and trailer TR, the contemplated position sensor(s) and pitch and yaw sensor(s) 285 are utilized by DMU 280 and/or other controller(s) to translate and adjust the CPs as mapped to the VPs, to articulate and adjust the relative orientations and articulation of the representative polyhedrons VPH, TPH (FIGS. 4, 5). The adjusted, articulated position information is then shared and/or communicated utilizing the V2V and V2I capabilities already described (FIGS. 7, 8, 9).

Figure 7:
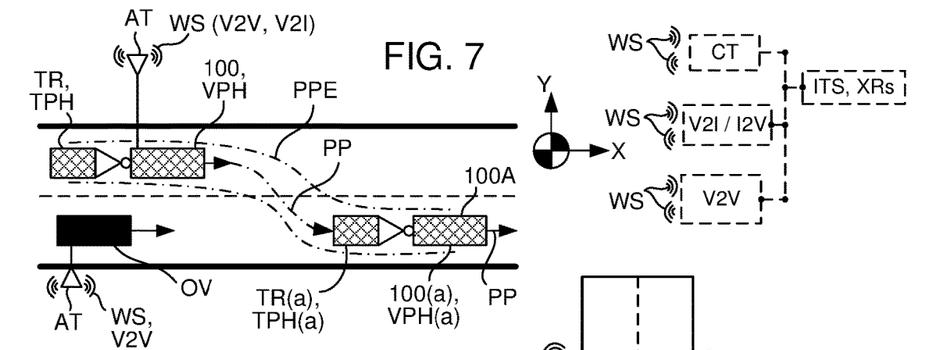
FIG. 7 reflects a schematic illustration of the vehicles of the preceding figures in operation about a substantially straight section of a roadway that is part of an Intelligent Transportation System (ITS)

In FIG. 7, vehicle 100 and trailer TR are schematically depicted in a starting position traveling about an ITS enabled roadway. As the combined vehicle 100 and trailer TR progress and pass another vehicle OV, DMU 280 and/or other controller(s) continuously and/or periodically detect CPs of trailer TR utilizing position sensor(s) and/or pitch and way sensors 285, and generate and communicate the polyhedrons VPH, TPH. As vehicle 100 and trailer TR pass OV, and initiate a lane change to proceed into the lane ahead of OV, the generated polyhedrons VPH, TPH are generated in an articulated orientation, which are communicated to OV and ITS. Either the controller(s) of vehicle 100 and/or those of OV and/or ITS, also generate and communicate predicted path PP and the predicted path envelope PPE.

As should be understood by those skilled in the technology, PPE is a traced volumetric envelope of predicted path PP, which is continuously updated and communicated over the contemplated V2V and V2I communications systems already described, utilizing the BMS-enabled technologies, such that the situational awareness of vehicle 100 and trailer TR, as well as that of OVs and ITS are enhanced. In this way, OVs and ITS may be enabled to maintain a continuous awareness of the position and orientation of vehicle 100 and trailer TR as the combination traverses the ITS-enabled roadway.

Figures 8, 9:
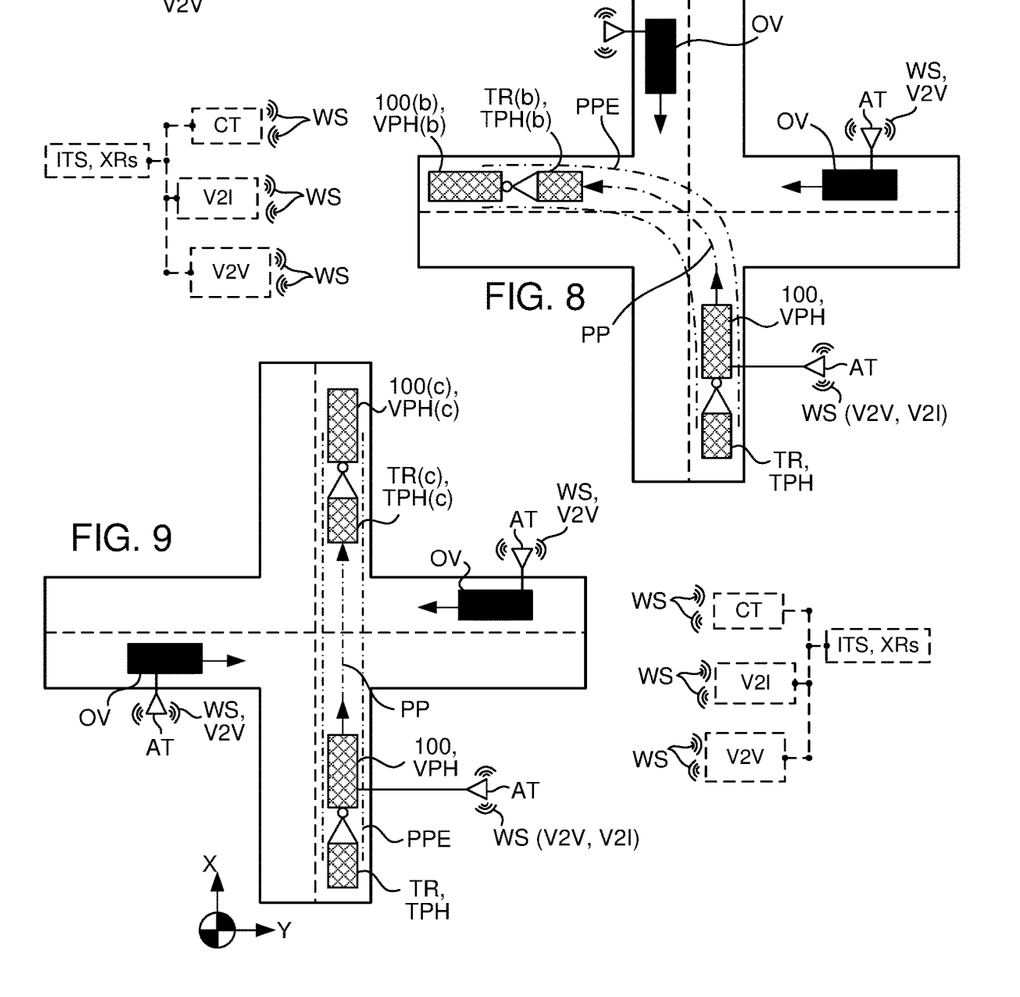
FIG. 8 illustrates a schematic depiction of the vehicles of the preceding figures in operation about a roadway intersection that is part of an ITS.
FIG. 9 depicts another schematic representation of the vehicles of the preceding figures in operation about another roadway intersection that is part of the ITS.

In FIG. 8, the combination vehicle 100 and trailer TR execute a left hand turn across an ITS-enabled intersection that includes OVs. As before, the controller(s) of vehicle 100 detect and generate the polyhedrons VPH, TPH to represent location and relative orientation. This information is shared and communicated by means of the V2V and V2I systems to enable enhanced situational awareness of the OVs and ITS as to the movement of vehicle 100 and trailer 100. In FIG. 9, vehicle 100 and trailer TR move across an ITS-enable intersection while sharing position and orientation information as before, which enables the ITS-roadway and OVs to maintain an awareness of the movements of vehicle 100 and trailer TR, which continues to enhance the situational awareness of OVs and ITS.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller coupled to a position sensor and a dynamics measurement unit, and configured to:
responsive to detecting positions of trailer vertices from the position sensor, generate vehicle and trailer polyhedrons including the trailer vertices mapped by the controller as polyhedron vertices, articulated about a hitch point wherein the controller, the position sensor and the dynamics measurement unit are located on the vehicle, and
responsive to the dynamics measurement unit detecting a trailer movement relative to the hitch point,
periodically communicate the generated articulated polyhedrons to a vehicle communications unit.

2. The vehicle according to claim 1, comprising:
the position sensor including a transceiver and the controller further configured to:
detect in real time the trailer vertices from respective wireless motion trackers in communication with the transceiver, relative to the hitch point, positioned at vertices on a trailer, and
generate the vehicle and trailer polyhedrons articulated about the hitch point and including the trailer vertices.

3. The vehicle according to claim 1, comprising:
the position sensor including a line of sight range finder configured to:
ping and detect initial trailer vertices as two dimensional positions of range finder reflectors, relative to the hitch point, and positioned at vertices on a trailer, and
generate the trailer polyhedron.

4. The vehicle according to claim 3, comprising:
the range finder configured to:
be vertically adjustable relative to a ground surface, and
detect the initial trailer vertices as three dimensional positions of the range finder reflectors relative to the hitch point.

5. The vehicle according to claim 4, comprising:
the controller further configured to:
responsive to the detected trailer movement relative to the hitch point,
adjust the initial trailer vertices according to the detected trailer movement to generate the trailer polyhedron articulated relative to the hitch point.

6. The vehicle according to claim 1, comprising:
the position sensor incorporating at least one hitch yaw and pitch sensor, and the controller further configured to:
responsive to yaw and pitch signals from the respective sensors,
generate the articulated polyhedrons adjusted by the yaw and pitch signals.

7. The vehicle according to claim 1, comprising:
the position sensor including at least one hitch yaw and pitch sensor, and the controller coupled to multiple antennas and at least one transceiver configured to communicate with a mobile device, and the controller further configured to:
responsive to detecting positions of trailer vertices from the mobile device detected by signal strength at each of the multiple antennas,
generate initial trailer vertices for a trailer mapped to trailer polyhedron vertices relative to the hitch point, according to the detected positions of trailer vertices.

8. The vehicle according to claim 7, comprising:
the controller further configured to:
responsive to yaw and pitch signals generated by the at least one yaw and pitch sensor,
adjust the positions of the initial trailer vertices according to the yaw and pitch signals, and
generate the articulated polyhedrons according to the adjusted positions of the trailer vertices.

9. The vehicle according to claim 1, comprising:
the position sensor including at least one hitch yaw and pitch sensor, and the controller coupled to a transceiver configured to communicate with a mobile device, and further configured to:
responsive to a trailer polyhedron generated by and received from the mobile device,
generate initial trailer vertices for a trailer, relative to the hitch point.

10. The vehicle according to claim 9, comprising:
the controller further configured to:
responsive to yaw and pitch signals,
adjust the positions of the initial trailer vertices according to the yaw and pitch signals, and
generate the articulated polyhedrons according to the adjusted positions of the trailer vertices.

11. A vehicle, comprising:
a controller coupled to a yaw and pitch sensor and a dynamics measurement unit wherein the controller, the yaw and pitch sensor and the dynamics measurement unit are located on the vehicle, and the controller is configured to:

responsive to detected trailer movement relative to a hitch point,
- adjust positions of trailer vertices according to yaw and pitch signals,
- generate vehicle and trailer polyhedrons according to the trailer vertices, articulated about the hitch point, and
- periodically communicate the generated articulated polyhedrons to a vehicle communication unit.

12. The vehicle according to claim 11, comprising:

the controller coupled to multiple antennas and at least one transceiver configured to communicate with a mobile device, and further configured to:

responsive to detecting positions of trailer vertices from the mobile device detected by signal strength at each of the multiple antennas,
- generate initial trailer vertices for a trailer mapped to trailer polyhedron vertices relative to the hitch point, according to the detected positions of trailer vertices.

13. The vehicle according to claim 12, comprising:

the controller further configured to:

responsive to yaw and pitch signals generated by the yaw and pitch sensor,
- adjust the trailer vertices from the positions of the initial trailer vertices according to the yaw and pitch signals, and
- generate the articulated polyhedrons according to the adjusted trailer vertices.

14. The vehicle according to claim 11, comprising:

the controller coupled to a transceiver configured to communicate with a mobile device, and further configured to:

responsive to a trailer polyhedron generated by and received from the mobile device,
- generate initial trailer vertices for a trailer, relative to the hitch point.

15. The vehicle according to claim 14, comprising:

the controller further configured to:

responsive to yaw and pitch signals generated by the yaw and pitch sensor,
- adjust the positions of the initial trailer vertices according to the yaw and pitch signals, and
- generate the articulated polyhedrons according to the adjusted positions of the trailer vertices.

16. A method of controlling a vehicle, comprising:

by a controller, coupled to a position sensor and a dynamics measurement unit, wherein the controller, the position sensors and the dynamics measurement unit are located on the vehicle:

responsive to detecting positions of trailer vertices by the position sensor,
- generating vehicle and trailer polyhedrons including the detected trailer vertices mapped to polyhedron vertices, articulated about a hitch point, and responsive to the dynamics measurement unit detecting a trailer movement relative to the hitch point,
- communicating periodically the generated articulated polyhedrons to a vehicle communications unit.

17. The method according to claim 16, comprising:

by the controller, the position sensor including a transceiver:
- detecting in real time the positions of trailer vertices from respective wireless motion trackers in communication with the transceiver, relative to the hitch point, positioned at vertices on a trailer, and
- generating the vehicle and trailer polyhedrons articulated about the hitch point and including the trailer vertices.

18. The method according to claim 16, further comprising:

by the controller, the position sensor including multiple antennas and at least one transceiver configured to communicate with a mobile device:

responsive to detecting positions of trailer vertices from the mobile device detected by signal strength at each of the multiple antennas,
- generate initial trailer vertices for a trailer mapped to trailer polyhedron vertices relative to the hitch point, according to the detected positions of trailer vertices.

19. The method according to claim 18, comprising:

by the controller:

responsive to yaw and pitch signals generated by a one yaw and pitch sensor incorporated with the position sensor,
- adjusting the positions of the initial trailer vertices according to the yaw and pitch signals, and
- generating the articulated polyhedrons according to the adjusted positions of the trailer vertices.

20. The method according to claim 16, further comprising:

by the controller, the position sensor including hitch yaw and pitch sensors and a transceiver configured to communicate with a mobile device, and further configured to:

responsive to a trailer polyhedron generated by and received from the mobile device,
- generate initial trailer vertices for a trailer, relative to the hitch point, responsive to yaw and pitch signals generated by the yaw and pitch sensors,
- adjust the positions of the initial trailer vertices according to the yaw and pitch signals, and
- generate the articulated polyhedrons according to the adjusted positions of the trailer vertices.

* * * * *